United States Patent
Chang et al.

(10) Patent No.: US 7,348,922 B2
(45) Date of Patent: Mar. 25, 2008

(54) ANTENNA SYSTEM FOR A GPS RECEIVER

(75) Inventors: Wen-Fong Chang, Taipei (TW); Yen-Hsiang Siung, Taipei (TW)

(73) Assignee: Inventec Appliances Corp., Taipei (TW)

(*) Notice: Subject to any disclaimer, the term of this patent is extended or adjusted under 35 U.S.C. 154(b) by 0 days.

(21) Appl. No.: 11/646,305

(22) Filed: Dec. 28, 2006

(65) Prior Publication Data

US 2007/0152880 A1    Jul. 5, 2007

(30) Foreign Application Priority Data

Dec. 30, 2005    (TW) .............................. 94147721 A

(51) Int. Cl.
G01S 5/14    (2006.01)
(52) U.S. Cl. .................................. 342/357.15
(58) Field of Classification Search ........... 342/357.15, 342/357.06
See application file for complete search history.

(56) References Cited

U.S. PATENT DOCUMENTS 6,292,147 B1 *  9/2001  Ham .......................... 343/702
2002/0044085 A1 *  4/2002  Howell et al. ......... 342/357.06
2003/0013470 A1 *  1/2003  Forrester .................... 455/506
2006/0046639 A1 *  3/2006  Walker et al. ............. 455/3.02
2006/0170590 A1 *  8/2006  Soman et al. .......... 342/357.12

FOREIGN PATENT DOCUMENTS

JP        2005017260 A   *   1/2005

OTHER PUBLICATIONS

English translation of JP 2005017260 A.*

* cited by examiner

Primary Examiner—Thomas H. Tarcza
Assistant Examiner—Fred H. Mull
(74) Attorney, Agent, or Firm—Birch, Stewart, Kolasch & Birch, LLP

(57) ABSTRACT

An antenna system for a GPS receiver that includes a casing and a micro processor. The antenna system includes at least two antenna units, a micro controller, a switching unit and a signal processor. The antenna units are used for receiving a satellite signal. Each of the antenna units owns a signal-receiving direction for guiding the satellite signal. The micro controller determines an optimal signal-receiving direction for receiving the satellite signal according to a use mode and generates a control signal for choosing a specific antenna from the antenna units. The switching unit is coupled to the antenna units and can define a receiving route for enabling the specific antenna to receive the satellite signal according to the control signal.

14 Claims, 4 Drawing Sheets

ANTENNA SYSTEM FOR A GPS RECEIVER

FIELD OF THE INVENTION

The invention relates to an antenna system and method thereof, and more particularly to an antenna system for a GPS (Global Positioning System) receiver and a switching method thereof.

BACKGROUND OF THE INVENTION

A GPS (Global Positioning System) receiver is usually used in a moving vehicle (including ships) to figure out its location or in case the driver get lost. The GPS receiver is constructed in such a manner to receive satellite signals from the satellites orbiting the Globe in the predictable paths. The satellite signals are used to compute positions in three dimensions and the time offset in the receiver clock, generally known as 3-D trilateral principle in mathematics. In case the computing of the positions through satellite signals is incorrect or affected due to atmospheric factor and resulting an error, the receiver is able to adjust the error with the assistance of a local broadcasting station in that particular area because the receiver is in constant communication with the local broadcasting station and because the local broadcasting station broadcasts radio signals with signal correction information for that particular area. Thus, the GPS receiver can figure out the exact location of the vehicle (hence the receiver) on earth regardless of the time, landscape and atmospheric conditions. It is in the trend to install the GPS receiver within the moving vehicle in order to facilitate the tracking of an intended route.

Nowadays, GPS technology is integrated in the electronic device (such as a PDA), and further network and information technologies are added, thus the electronic device as a whole is suitable for an individual requirement. The utility of GPS receiver crosses the boundary of vehicles and enters the consumer's daily life.

FIG. 1A is a schematic view of a prior art stationary GPS receiver while FIG. 1B is a block diagram representing the components for forming the prior art stationary GPS receiver of FIG. 1A. The prior art GPS receiver 1 accordingly includes an antenna unit 11, a signal processor 13, a micro controller 14, a micro processor 15 and a display panel 17. The antenna unit 11 is adapted to receive the satellite signal and later transmits the same to the signal processor 13 for processing (such as amplifying and filtering). The result is then transmitted to the micro processor 15. The GPS receiver stores some built-in software, such as navigation calculation programs, data processing programs and an almanac for computing the positions. The micro controller 14 orders the micro processor 15 to execute the analyzing and the computing operation. The final result (location of the vehicle) is shown in the display panel 17.

When the GPS receiver is installed in a vehicle, as shown in FIG. 1A, it is generally known as stationary since the position thereof cannot be changed according to the wishes of the driver. FIG. 1B is a block diagram representing the components for forming the prior art stationary GPS receiver of FIG. 1A. The prior art GPS receiver 1 accordingly includes an outer casing 10 disposed vertically (in C arrow direction) on a supporting surface, an antenna unit 11 (generally a patch antenna or inverted F-shaped antenna) is mounted on the casing 10 for receiving or transmitting signals. The antenna unit 11 is adapted to receive or transmit the signal at various angles. For the patch antenna, the signal-receiving direction tends upwardly from its mounting position. In order to achieve the great signal-receiving ability (i.e. a relatively strong satellite signal), the antenna unit 11 is mounted on a first lateral side 100 of the casing 10. Thus, its signal-receiving direction is in the arrow A direction, i.e. an upward direction.

FIG. 2 shows the prior art GPS receiver 1 in a portable mode (held within a user's hand). Under this condition, the direction of the display panel 17 is changed from that shown in FIG. 1A according to the user's holding habit. The display panel 17 in FIG. 2 has a narrower width but taller height, and extends in the vertical direction when compared with that of FIG. 1A. Because the position is changed, the second lateral side 101 of the casing 10 is located at the topside or the signal-receiving direction (arrow A direction) while the antenna unit 11 is disposed to extend. in the arrow D direction. When the prior art GPS receiver 1 is held as shown in FIG. 2, the signal-receiving strength thereof is reduced considerably because the orientation of the antenna unit 11 is transverse to the signal-receiving direction, thereby causing interruption in the signal transmission or delay in signal transmission.

It is the object of the present invention to propose a GPS receiver having an antenna unit capable of switching to a required direction so as to receive the incoming satellite signals and the switching method thereof.

SUMMARY OF THE INVENTION

It is the object of the present invention to provide a GPS receiver free from abovementioned drawbacks.

Another object of the present invention is to provide a switching method for the GPS receiver of the present invention so that the GPS receiver can receive the satellite signal regardless of its location within a moving vehicle or a personal holding device.

In one aspect of the present invention, an antenna system is provided for a GPS (Global Positioning System) receiver that includes a casing and a micro processor. The antenna system includes at least two antenna units, a micro controller, a switching unit and a signal processor. The antenna units are used for receiving a satellite signal. Each of the antenna units owns a signal-receiving direction for guiding the satellite signal toward the GPS receiver and away therefrom. The micro controller determines an optimal signal-receiving direction for receiving the satellite signal according to a use mode of the GPS receiver and generating a control signal for choosing a specific antenna from the antenna units, wherein the optimal signal-receiving direction corresponds to the signal-receiving direction for the specific antenna. The switching unit is coupled to the antenna units and defines a receiving route for enabling the specific antenna to receive the satellite signal according to the control signal. The signal processor is coupled to the switching unit for processing (such as amplifying and filtering) the satellite signal after the specific antenna receives the satellite signal and transmitting the satellite signal to the micro processor after processing.

In a second aspect of the present invention, a GPS (Global Positioning System) receiver is provided and includes a casing, a micro processor and an antenna system. The micro processor is mounted within the casing. The antenna system includes at least two antenna units, a micro controller, a switching unit and a signal processor. The antenna units are used for receiving a satellite signal. Each of the antenna units owns a signal-receiving direction for guiding the satellite signal toward the GPS receiver and away therefrom. The micro controller determines an optimal signal-receiving direction for receiving the satellite signal according to a use mode of the GPS receiver and generating a control signal for choosing a specific antenna from said at least two antenna units, wherein the optimal signal-receiving direction corresponds to the signal-receiving direction for the specific antenna. The switching unit is coupled to the antenna units and defines a receiving route for enabling the specific antenna to receive the satellite signal according to the control signal. The signal processor is coupled to the switching unit for processing (such aw amplifying and filtering) the satellite signal after the specific antenna receives the satellite signal and transmitting the satellite signal to the micro processor after processing.

In a third aspect of the present invention, a switching method is provided for a GPS (Global Positioning System) receiver. The GPS receiver includes an antenna system. The switching method includes the following steps: (a) preparing at least two antenna units in the antenna system, each of the antenna units owning a signal-receiving direction; (b) determining an optimal signal-receiving direction according to a use mode of the GPS receiver; (c) generating a control signal for choosing a specific antenna from the antenna units, wherein the optimal signal-receiving direction corresponds to the signal-receiving direction for the specific antenna; (d) defining a receiving route for enabling the specific antenna to receive a satellite signal according to the control signal.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTIONS OF THE PREFERRED EMBODIMENTS

Figure 1:
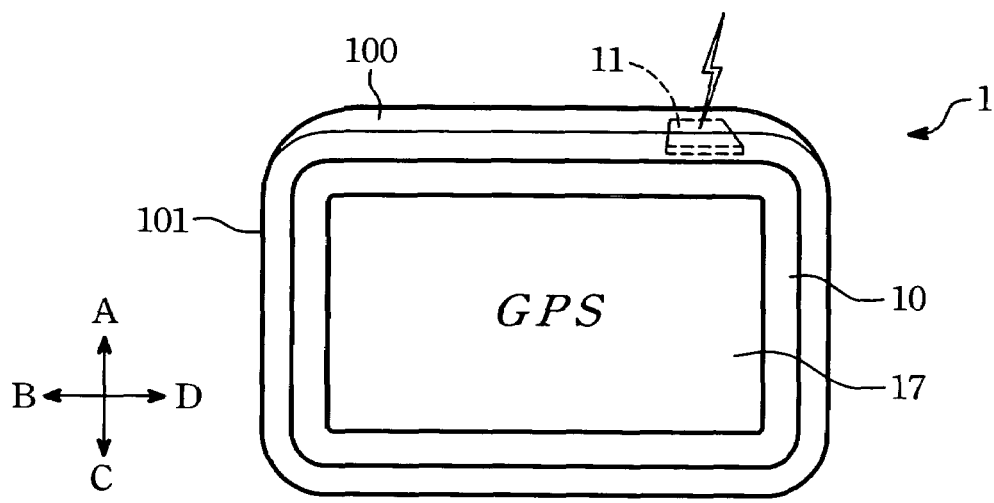
FIG. 1A is a schematic view of a prior art stationary GPS receiver.
FIG. 1B is a block diagram representing the components for forming the prior art stationary GPS receiver of FIG. 1A.
Figure 1:
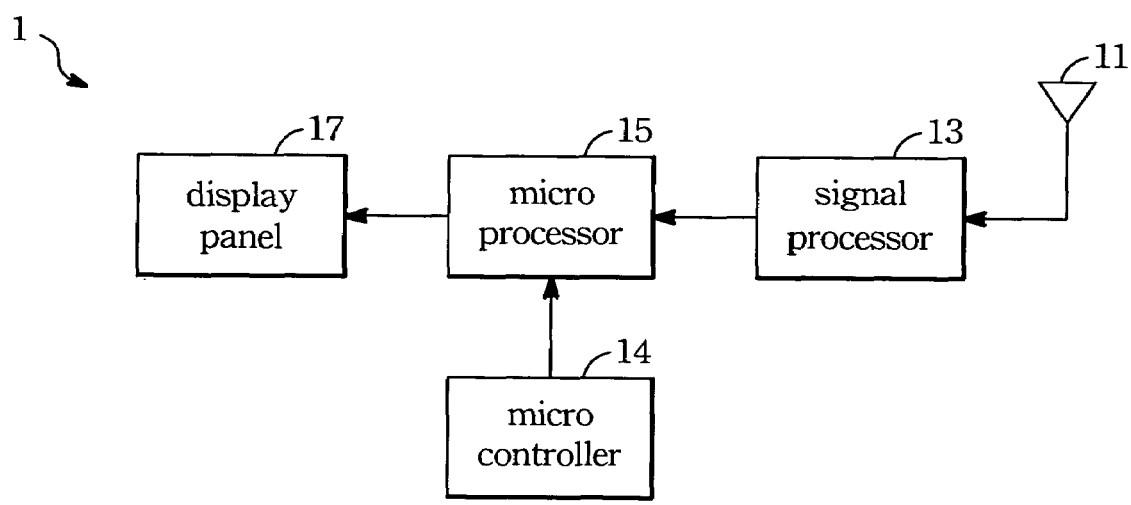
Figure 2:
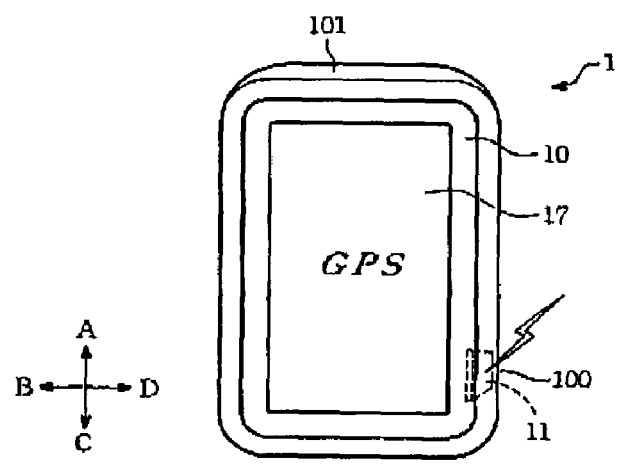
FIG. 2 is a schematic view of the prior art stationary GPS receiver when held in a user's hand.
Figure 3A:
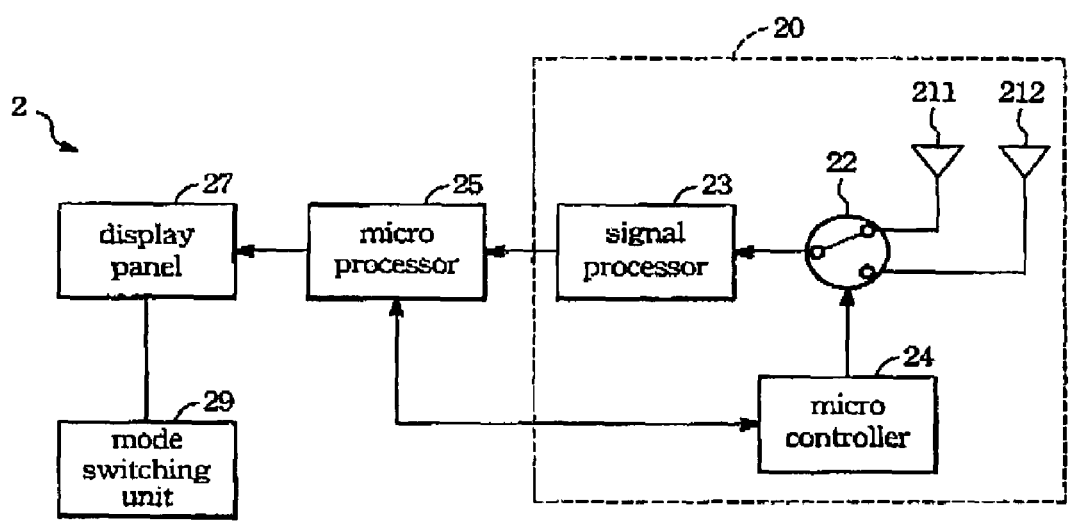
FIG. 3A is a block diagram representing the components for forming the first embodiment of a GPS receiver of the present invention.
Figure 3:
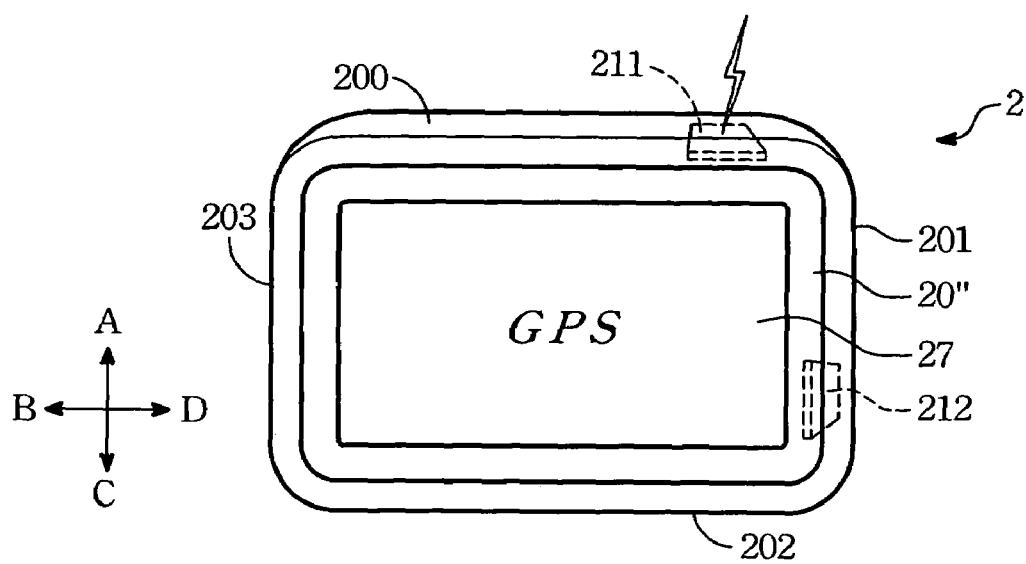
FIGS. 3B and 3C respectively show a schematic view of the first embodiment of the GPS receiver of the present invention.
Figure 3:
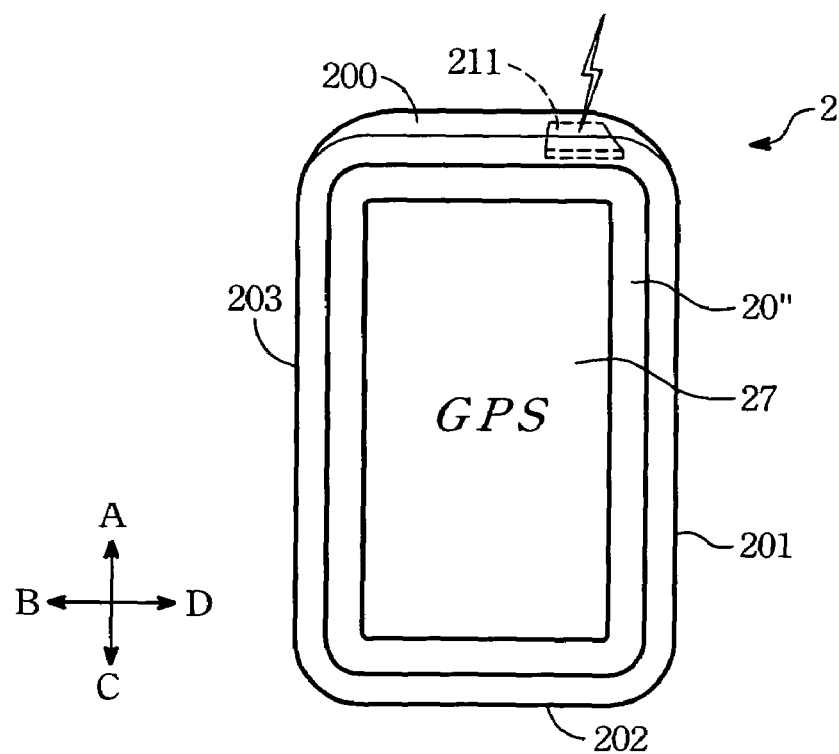

FIG. 3A is a block diagram representing the components for forming the first embodiment of a GPS (Global Positioning System) receiver 2 of the present invention, and includes a display panel 27, a micro processor 25 and an antenna system 20. The antenna system 20 includes at least two antenna units 211, 212, a micro controller 24, a switching unit 22 and a signal processor 23.

The antenna units 211, 212 are used for receiving the satellite signals. Each of the antenna units 211, 212 owns a signal-receiving direction for guiding the satellite signal toward the GPS receiver 2.

The micro controller 24 is capable of determining a preferred signal-receiving direction for receiving the satellite signal according to a use mode of the GPS receiver 2. In addition, the micro controller 24 can generate a control signal for choosing a specific antenna from the two antenna units, wherein the optimal signal-receiving direction corresponds to the signal-receiving direction for the specific antenna.

The switching unit 22 is coupled to the antenna units 211, 212 and capable of defining a receiving route for enabling the specific antenna to receive the satellite signal according the control signal. The signal processor 23 is coupled to the switching unit 22 for processing (such as amplifying and filtering) the satellite signal after the specific antenna receives the satellite signal and transmitting the satellite signal to the micro processor 25 after processing. The micro controller 24 orders the micro processor 25 to execute the analyzing operation of the satellite signals and computing the positions through the stored software, such as calculation program and an almanac. The final result is then transmitted to and is shown in the display panel 27.

Referring to FIGS. 3B and 3C, the GSP receiver 2 of the present invention includes a casing 20" having a first lateral side 200, a second lateral side 201, a third lateral side 202 and a fourth lateral side 203. The first and second antenna units 211, 212 can be a patch antenna or an inverted F-shaped antenna (PIFA), each having features different from each other to define different signal-receiving directions and angles. For instance, the patch antenna owns a signal-receiving direction extends upwardly therefrom. In the first embodiment, the first and second antenna units 211, 212 are two pieces of patch antenna. However, the limiting scope of the present invention should cover more than this embodiment.

In the first embodiment, the first antenna unit 211 and the second antenna unit 212 are mounted on the first and second lateral sides 200, 201 of the casing 20" and extend inwardly into the casing 20". Since the second lateral side 201 extends perpendicularly from the first lateral side 200, the signal-receiving direction of the first antenna unit 211 is in the arrow A direction while the second antenna unit 212 is in the arrow D direction.

The display panel 27 is connected to the micro processor 25 for displaying an image data in a first or a second mode. The GPS receiver 2 of the present invention further includes a mode-switching unit (not shown) for changing from one of the first and second modes to the other. The display panel 27 has a top and a bottom portions deciding a display direction. The display direction defines the first mode and the second mode. The first mode and the second mode are perpendicular to each other. A fixed key (touch key) on the display panel 27 of the GPS receiver 2 or a module of a firmware system may serve as the mode switching unit 29 so that actuation of the mode switching unit can result in changing the display direction of the display panel 27. The display panel 27 will inform the micro controller 24 via the micro processor 25 about the display direction of the display panel 27 so that the micro controller 24 determines the optimal signal-receiving direction according to the use mode of the GPS receiver 2 of the present invention.

As illustrated in FIG. 3C, the display direction of the display panel 27 is in the arrow C direction (downward direction). The optimal signal-receiving direction is in the arrow A direction (upward direction. Under this condition, the signal-receiving direction of the first antenna unit 211 is in the arrow A direction. Therefore, the first antenna unit 211 serves as the specific antenna. Referring to FIG. 3B, the second antenna unit 212 serves as the specific antenna in the same manner.

Figure 4:
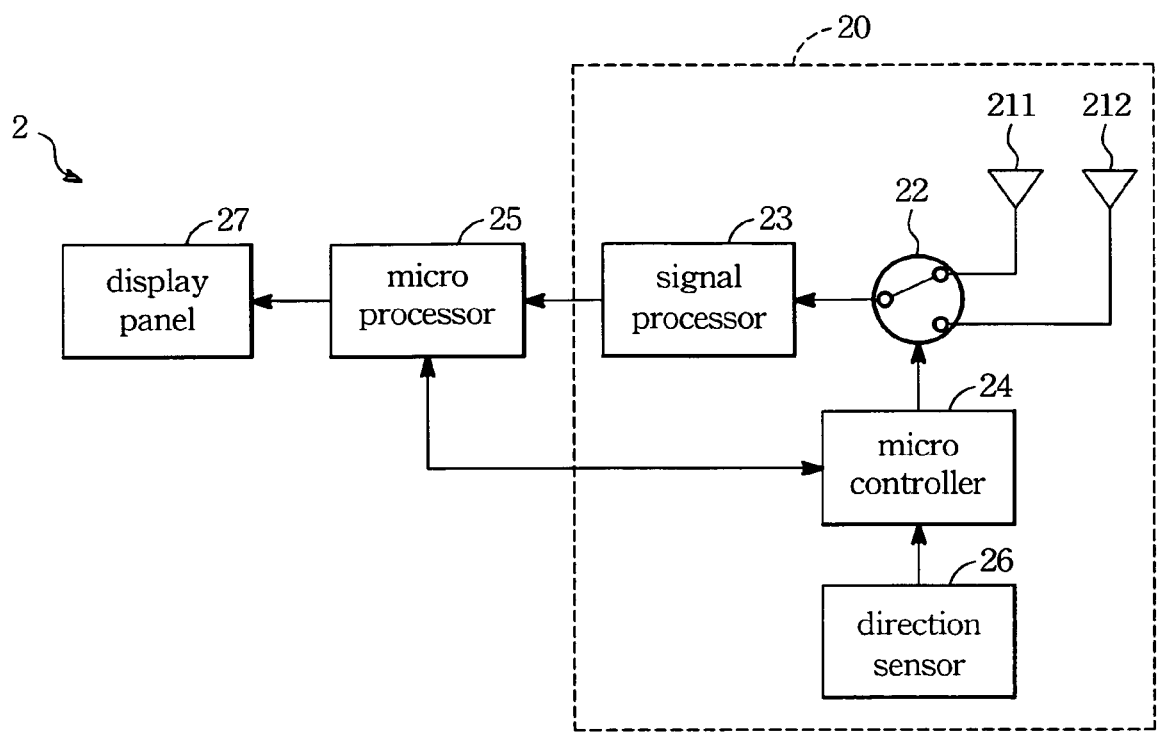
FIG. 4 is a block diagram representing the components for forming the second embodiment of the GPS receiver of the present invention.

Referring to FIG. 4, the second embodiment of the GPS receiver 2 has been proposed, which can maintain its signal-receiving direction regardless of its holding mode, i.e. the disposed orientation of the casing 20". The antenna system 20 employed in the second embodiment further includes a direction sensor 26 for detecting the disposed orientation of the casing 20" and generating an orientation signal for the micro controller to determine the optimal signal-receiving direction. FIGS. 3B and 3C shows two display directions of the display panel 27 respectively corresponding to the optimal signal-receiving direction of the specific antenna. In this embodiment, the direction sensor 26 comprises a dual-axis (XY) accelerometer.

Note that in the first and second embodiments, even though the same casing 20" is used, but the structure of the casing 20" should not be limited only thereto.

Figure 5:
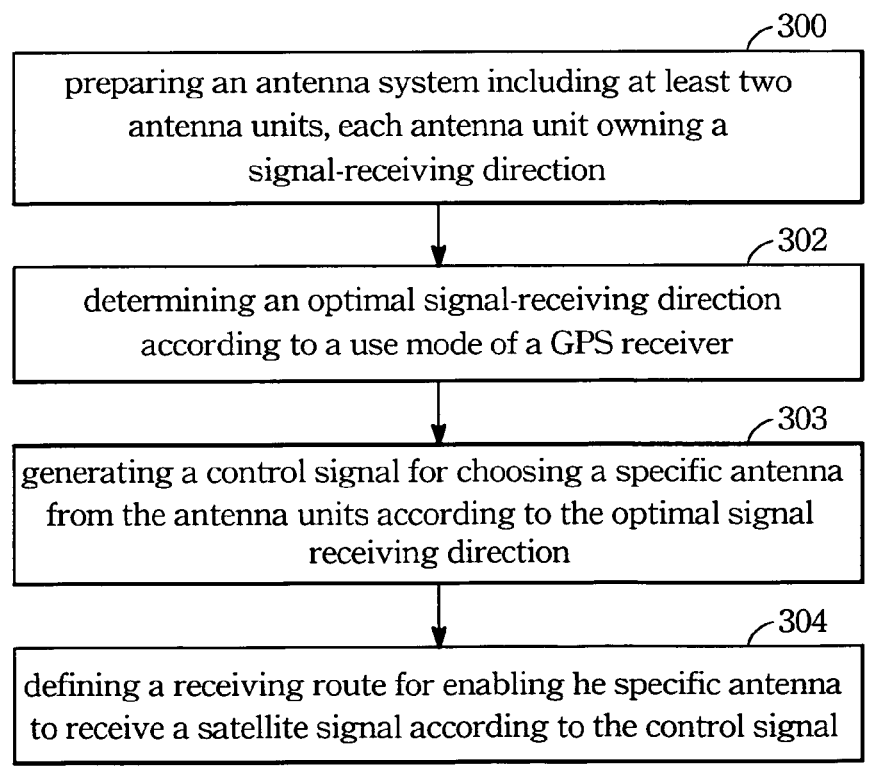
FIG. 5 shows the steps of the switching method employed in the GPS receiver of the present invention.

FIG. 5 shows the steps of the switching method employed in the GPS receiver of the present invention. The switching method includes the following steps:

According to the step (300), the GPS receiver including an antenna system 20 (see FIGS. 3A, 3B, 3C) comprises a plurality of antenna units. Each of the antenna units owns a signal-receiving direction.

According to the step (302) and (303), the micro controller 24 determines an optimal signal-receiving direction according to a use mode of the GPS receiver, and generates a control signal for choosing a specific antenna from the antenna units, wherein the optimal signal-receiving direction corresponds to the signal-receiving direction for the specific antenna.

Finally, according to the step (304), the switching unit 22 defines a receiving route for enabling the specific antenna to receive a satellite signal according to the control signal.

In the first embodiment, the use mode of the GPS receiver is a display direction of the display panel 27. The optimal signal-receiving direction corresponds to the extending direction of the image data.

In the second embodiment, the use mode of the GPS receiver is a disposed orientation of the casing 20". The optimal signal-receiving direction corresponds to the disposed orientation of the casing 20".

From the aforementioned embodiments, it can be observed that once the switching method of the antenna system 20 is provided in the GPS receiver of the present invention, the use mode of the receiver can still able to provide the specific antenna for which the optimal signal-receiving direction corresponds to the signal-receiving direction in order to receive the satellite signal. The signal-receiving ability of the receiver is not affected regardless of the disposed orientation of the casing of the GPS receiver within a moving vehicle or when a traveling person holds the casing of the receiver. In other words, the signal-receiving strength of the antenna system in the GPS receiver of the present invention is constant regardless of its location or holding position.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. An antenna system for a GPS (Global Positioning System) receiver having a casing and a micro processor, the antenna system comprising:

at least two antenna units for receiving a satellite signal, each of said antenna units owning a different signal-receiving direction for guiding the satellite signal toward the GPS receiver;

a micro controller for determining an optimal signal-receiving direction for receiving the satellite signal according to a use mode of the GPS receiver and generating a control signal for choosing a specific antenna from said at least two antenna units according to the optimal signal-receiving direction;

a switching unit coupling to said antenna units and defining a receiving route for enabling the specific antenna to receive the satellite signal according to the control signal;

a signal processor coupling to said switching unit for processing the satellite signal after the specific antenna receives the satellite signal and transmitting the satellite signal to the micro processor after processing; and a direction sensor for detecting the disposed orientation of the casing and generating an orientation signal for said micro controller to determine the optimal signal-receiving direction.

2. The antenna system according to claim 1, wherein one of said antenna units is mounted on a first lateral side of the casing while the other one of said antenna units is mounted on a second lateral side of the casing, the second lateral side extending perpendicularly from the first lateral side.

3. The antenna system according to claim 1, wherein the GPS receiver further comprises:

a display panel connected to the micro processor for displaying an image data in a first or a second mode, wherein the first mode and the second mode are defined by a display direction of said display panel; and a mode switching unit for changing from one of the first and second modes to the other.

4. The antenna system according to claim 3, wherein the use mode is one of the first and second modes.

5. The antenna system according to claim 3, wherein the first mode and the second mode are perpendicular to each other.

6. The antenna system according to claim 1, wherein the use mode is a disposed orientation of the casing.

7. The antenna system according to claim 1, wherein said direction sensor comprises a dual-axis accelerometer.

8. A GPS (Global Positioning System) receiver comprising:

a casing;

a micro processor mounted within said casing; and an antenna system comprising at least two antenna units for receiving a satellite signal, each of said antenna units owning a signal-receiving direction for guiding the satellite signal toward the GPS receiver, a micro controller for determining an optimal signal-receiving direction for receiving the satellite signal according to a use mode of the GPS receiver and generating a control signal for choosing a specific antenna from said at least two antenna units according to the optimal signal-receiving direction, a switching unit coupling to said antenna units and defining a receiving route for enabling the specific antenna to receive the satellite signal according to the control signal, a signal processor coupling to said switching unit for processing the satellite signal after the specific antenna receives the satellite signal and transmitting the satellite signal to said micro processor after processing; and a direction sensor for detecting the disposed orientation of said casing and generating an orientation signal for said micro controller to determine the optimal signal-receiving direction.

9. The GPS receiver according to claim 8, wherein one of said antenna units is mounted on a first lateral side of said casing while the other one of said antenna units is mounted on a second lateral side of said casing, said second lateral side extending perpendicularly from said first lateral side.

10. The GPS receiver according to claim 8, further comprising a display panel connected to said micro processor for displaying an image data in a first or a second mode, wherein the first mode and the second mode are defined by a display direction of said display panel, and a mode switching unit for changing from one of the first and second modes to the other.

11. The GPS receiver according to claim 10, wherein the use mode is one of the first and second modes.

12. The GPS receiver according to claim 10, wherein the first mode and the second mode are perpendicular to each other.

13. The GPS receiver according to claim 8, wherein the use mode is a disposed orientation of said casing.

14. The GPS receiver according to claim 8, wherein said direction sensor comprises a dual-axis accelerometer.

* * * * *